US011625287B2

(12) United States Patent
Moroski et al.

(10) Patent No.: US 11,625,287 B2
(45) Date of Patent: Apr. 11, 2023

(54) METHOD AND SYSTEM FOR USING DEFINED COMPUTING ENTITIES

(71) Applicant: VMware, Inc., Palo Alto, CA (US)

(72) Inventors: Jeff Moroski, South Abington Township, PA (US); Glenn Bruce McElhoe, Arlington, MA (US); Stephen Evanchik, Danvers, MA (US); Iliyan Lesev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/155,762

(22) Filed: Jan. 22, 2021

(65) Prior Publication Data

US 2022/0237053 A1 Jul. 28, 2022

(51) Int. Cl.
*G06F 9/54* (2006.01)
*G06F 16/21* (2019.01)
*H04L 67/10* (2022.01)
*G06F 9/455* (2018.01)

(52) U.S. Cl.
CPC .............. *G06F 9/541* (2013.01); *G06F 9/543* (2013.01); *G06F 16/212* (2019.01); *H04L 67/10* (2013.01); *G06F 9/45541* (2013.01)

(58) Field of Classification Search
CPC .................................. G06F 9/541; G06F 9/547
See application file for complete search history.

(56) References Cited

U.S. PATENT DOCUMENTS

| 11,010,191 | B1 * | 5/2021 | Hornbeck | G06F 9/5072 |
| 2007/0255717 | A1 * | 11/2007 | Baikov | H04L 67/02 |
| 2007/0255718 | A1 * | 11/2007 | Baikov | H04L 67/16 |
| 2009/0049422 | A1 * | 2/2009 | Hage | G06F 8/10 |
| | | | | 717/104 |
| 2010/0281060 | A1 * | 11/2010 | Ahmed | G06F 21/6227 |
| | | | | 707/805 |
| 2013/0268258 | A1 * | 10/2013 | Patrudu | G06F 40/40 |
| | | | | 704/9 |
| 2015/0101042 | A1 * | 4/2015 | Yang | G06F 9/455 |
| | | | | 726/21 |
| 2015/0143329 | A1 * | 5/2015 | Barinaga | G06F 9/448 |
| | | | | 717/104 |
| 2020/0226009 | A1 * | 7/2020 | Bachmutsky | G06F 8/44 |
| 2022/0012045 | A1 * | 1/2022 | Rudraraju | G06F 8/36 |

* cited by examiner

*Primary Examiner* — Brian W Wathen
(74) *Attorney, Agent, or Firm* — Loza & Loza, LLP (57) ABSTRACT

System and method uses a defined entity type that describes a data structure of a defined computing entity and at least one behavior of the defined computing entity based on user input information. The at least one behavior of the defined computing entity is defined by associating at least one interface with the defined entity type, where the at least one interface represents a reference entity type with a collection of behavior information. An operation is then executed on the defined computing entity according to the at least one behavior of the defined computing entity.

20 Claims, 4 Drawing Sheets

FIG. 4

METHOD AND SYSTEM FOR USING DEFINED COMPUTING ENTITIES

BACKGROUND

Software products and platforms may have a certain set of object types or entities on which the software products and platforms can properly operate. For example, file systems may have files, folders, and links, while databases may have columns, tables, stored procedures, etc. A cloud platform may have one or more computing entities, such as, virtual machines, users and groups, networks, tenants, etc.

Software or service providers building a solution around one or more cloud platforms can differentiate themselves from competitors by providing features around additional functionality, such as, autoscale rules, disaster recovery (DR) policies, etc., that underlying platform(s) may not be aware. However, features around additional functionality that an underlying platform may not be aware may cause compatibility issues in the underlying platform. Therefore, there is a need to a software or service provider to define a computing entity and to allow a corresponding cloud platform to learn about the defined computing entity and treat the defined computing entity as a peer to existing platform entities, for example, with respect to entitlements, access control, tenancy boundaries, data validation, searching and filtering, lifecycle, and execution of operations.

SUMMARY

System and method uses a defined entity type that describes a data structure of a defined computing entity and at least one behavior of the defined computing entity based on user input information. The at least one behavior of the defined computing entity is defined by associating at least one interface with the defined entity type, where the at least one interface represents a reference entity type with a collection of behavior information. An operation is then executed on the defined computing entity according to the at least one behavior of the defined computing entity.

A computer-implemented method for using defined computing entities in accordance with an embodiment of the invention comprises, based on user input information, specifying a defined entity type that describes a data structure of a defined computing entity and at least one behavior of the defined computing entity, defining the at least one behavior of the defined computing entity by associating at least one interface with the defined entity type, where the at least one interface represents a reference entity type with a collection of behavior information, and executing an operation on the defined computing entity according to the at least one behavior of the defined computing entity. In some embodiments, the steps of this method are performed when program instructions contained in a non-transitory computer-readable storage medium are executed by one or more processors.

A system in accordance with an embodiment of the invention comprises memory and at least one processor configured to, based on user input information, specify a defined entity type that describes a data structure of a defined computing entity and at least one behavior of the defined computing entity, define the at least one behavior of the defined computing entity by associating at least one interface with the defined entity type, where the at least one interface represents a reference entity type with a collection of behavior information, and execute an operation on the defined computing entity according to the at least one behavior of the defined computing entity.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

Figure 1:
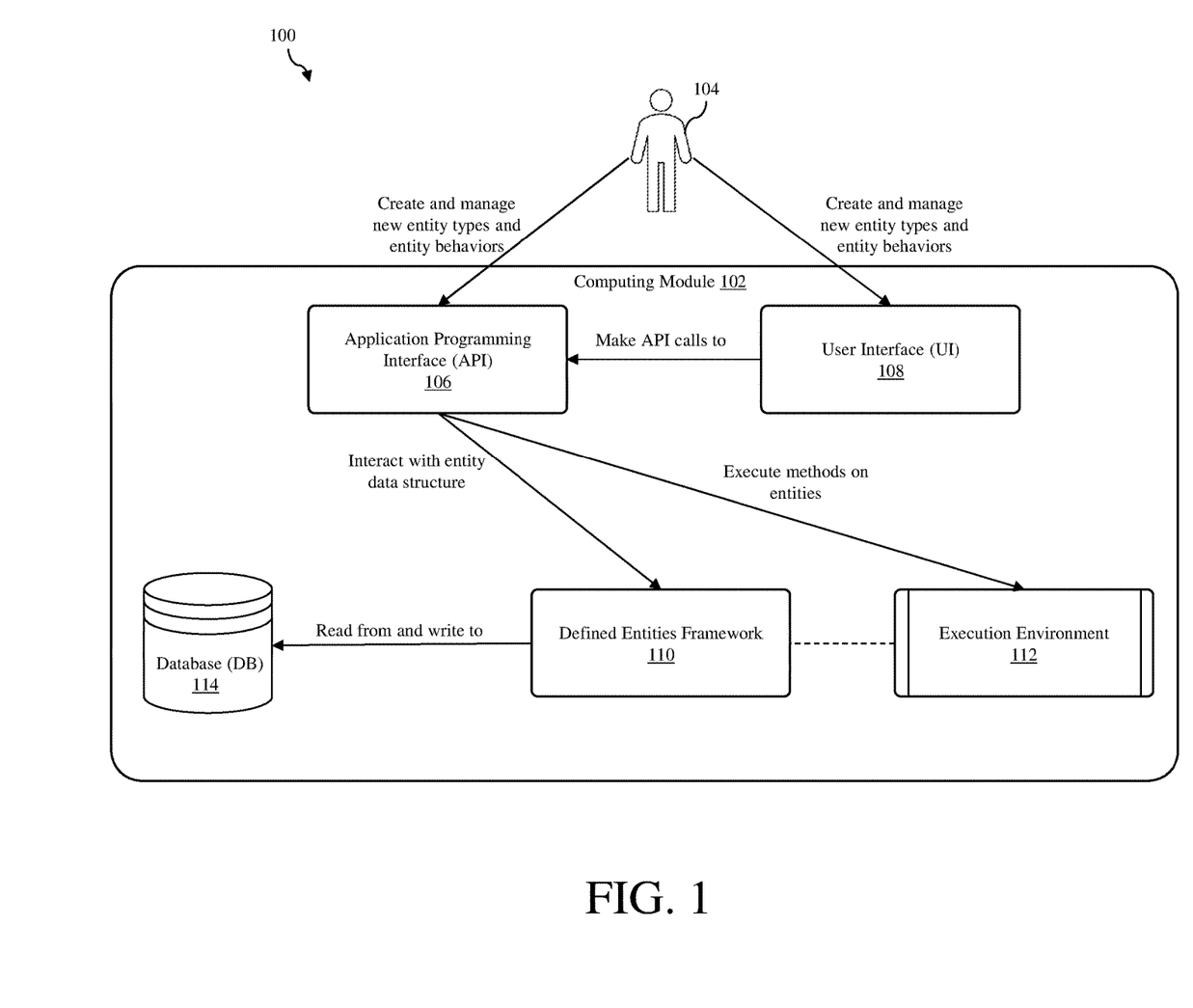
FIG. 1 is a block diagram of a computing system in which the embodiments of the present invention may be implemented in accordance with various aspects of the invention.

Turning now to FIG. 1, a block diagram of a computing system 100 in which embodiments of the present invention may be implemented in accordance with various aspects of the invention is shown. As shown in FIG. 1, the computing system 100 includes at least one computing module 102, which may be used by at least one operator 104. The computing system 100 is configured to provide a platform for managing and executing commands, instructions, and/or workloads. The computing system 100 may be a cloud computing system, for example, a private cloud computing system and/or a public cloud computing system. For example, the computing system 100 can be used in cloud computing and/or cloud storage architectures, for example, for offering software as a service (SaaS) cloud services. SaaS cloud service is a type of software distribution cloud service in which a service provider hosts software applications for customers in a cloud environment. Examples of cloud architectures include, but not limited to, the VMware Cloud architecture software, Amazon Elastic Compute Cloud (EC2™) web service, and OpenStack™ open source cloud computing service. Although the computing system 100 is shown in FIG. 1 as including one computing module 102, in other embodiments, the computing system 100 may include more than one computing entities, which may be used by multiple operators.

In the computing system 100 depicted in FIG. 1, the computing module 102 includes an application programming interface (API) 106, a user interface (UI) 108, a defined entities framework 110, an execution environment 112, and a database (DB) 114. The computing module 102 may include one or more computing instances and/or one or more computing hardware devices. As used herein, the term "computing instance" or "virtual computing instance" refers to any software processing entity that can run on a computer system, such as a software application, a software process, a virtual machine (VM), e.g., a VM supported by virtualization products of VMware, Inc., and a software "container", e.g., a Docker container. In some embodiments of this disclosure, a computing instance may be described as being a VM, although embodiments of the invention described herein are not limited to virtual machines. The computing module 102 may be implemented in hardware (e.g., circuits), software, firmware, or a combination thereof. For example, the API 106, the UI 108, the defined entities framework 110, the execution environment 112, and/or the DB 114 may be implemented using one or more software programs that reside and execute in one or more computer systems, such as one or more computer hosts. The computer hosts may be constructed on a server grade hardware platform, such as an x86 architecture platform. As shown, the hardware platform of each host may include conventional components of a computing device, such as one or more processors (e.g., CPUs), system memory, a network interface, storage system, and other I/O devices such as, for example, a mouse and a keyboard. The processors are configured to execute instructions such as, for example, executable instructions that may be used to perform one or more operations described herein and may be stored in the memory and the storage system. The memory may include, for example, one or more random access memory (RAM) modules. The network interface may be one or more network adapters, also referred to as a Network Interface Card (NIC). The storage system represents local storage devices (e.g., one or more hard disks, flash memory modules, solid state disks and optical disks) and/or a storage interface that enables the host to communicate with one or more network data storage systems. In some embodiments, each host is configured to provide a virtualization layer that abstracts processor, memory, storage, and networking resources of a hardware platform into virtual computing instances, e.g., virtual machines, that run concurrently on the same host. Although the computing module 102 is shown in FIG. 1 as including certain elements, in other embodiments, the computing module 102 may include more or less additional components to implement more or less additional functionalities.

In the computing module 102, the API 106 is configured to receive inputs from the operator 104 to create and manage one or more defined software or computing entity types and defined entity behaviors. In some embodiments, the API 106 is configured to interact with the defined entities framework 110 and to execute methods (e.g., operations) on one or more software or computing entities in the execution environment 112. In the computing module 102, the UI 108 is configured to receive inputs from the operator 104 to create and manage one or more defined software or computing entity types and defined entity behaviors.

In the computing module 102 depicted in FIG. 1, the defined entities framework 110 is configured to allow the operator 104 to provision one or more computing or software entities and/or install and execute various software services and/or applications in the computing or software entities. In some embodiments, the defined entities framework 110 is configured to execute software instructions on virtual computing instances and/or host computers. The defined entities framework 110 can read from and write to the DB 114. In some embodiments, the defined entities framework 110 contains four software abstractions, which are defined entities, defined entity types, interfaces, and behaviors. In an embodiment, a defined entity type is configured to define a data schema that a software entity must adhere to and operations that can be performed on the software entity (e.g., indirectly through interface associations). The data schema for a defined entity type can be used to provides a rich querying experience with filtering and sorting capabilities that are on par (or even better than) the query capabilities available for built-in entity types. In an embodiment, an interface is configured to define a reference implementation and can be used to group similar entities together and to provide a contract for operations (e.g., behaviors). In an embodiment, a behavior is an executable operation that can be performed on a defined software entity.

In some embodiments, the defined entities framework 110 is configured to, based on user input information, specify a defined entity type that describes a data structure of a defined computing entity and at least one behavior of the defined computing entity, define the at least one behavior of the defined computing entity by associating at least one interface with the defined entity type, where the at least one interface represents a reference entity type with a collection of behavior information, and execute an operation on the defined computing entity according to the at least one behavior of the defined computing entity. In some embodiments, the defined entities framework 110 is configured to instantiate the defined computing entity as an instance of the defined entity type, where the defined computing entity has the data structure and exhibits the at least one behavior. The defined entities framework 110 may execute the operation on the defined computing entity in a hybrid cloud system according to the at least one behavior of the defined computing entity. In some embodiments, the at least one behavior of the defined computing entity represents an executable operation having an operation definition and an operation binding. The operation definition may include a name of the executable operation, input information of the executable operation, and output information of the executable operation, and wherein the operation binding comprises a type of execution of the executable operation and a logic to be executed for the executable operation. In some embodiments, the data structure of the defined computing entity is defined as a data schema to which the defined computing entity adheres. In an embodiment, the data schema represents at least one data field to be presented in the defined computing entity and data type information, cardinality information, and optionality information of the at least one data field. In some embodiments, the defined computing entity is a run-time entity. In some embodiments, the defined entities framework 110 is configured to specify a set of rights for accessing the defined entity type. The set of rights for accessing the defined entity type may defines multiple levels of access control of the defined entity type by a user or an administrator. In some embodiments, the defined entities framework 110 is configured receive the user input information from a user through an application programming interface (API). In some embodiments, the defined entities framework 110 is configured receive the user input information from a user through a user interface (UI) and an API coupled to the UI.

In the computing module 102, the execution environment 112 is configured to execute one or more operations on one or more software or computing entities, which may include at least one defined computing entity and/or at least one built-in computing entity. In some embodiments, the execution environment 112 is configured to execute methods (e.g., operations) on one or more software or computing entities based on inputs from the API 106 and/or the UI 108.

In the computing system 100 depicted in FIG. 1, the operator 104 can create and manage one or more defined software or computing entity types and defined entity behaviors. For example, the operator 104 may be a worker on-site or an end-user such as an employee of an enterprise. In some embodiments, the operator 104 is a network and/or computer system administrator. The operator 104 may use the API 106 and/or the UI 108 to create and manage one or more defined software or computing entity types and defined entity behaviors.

Figure 2:
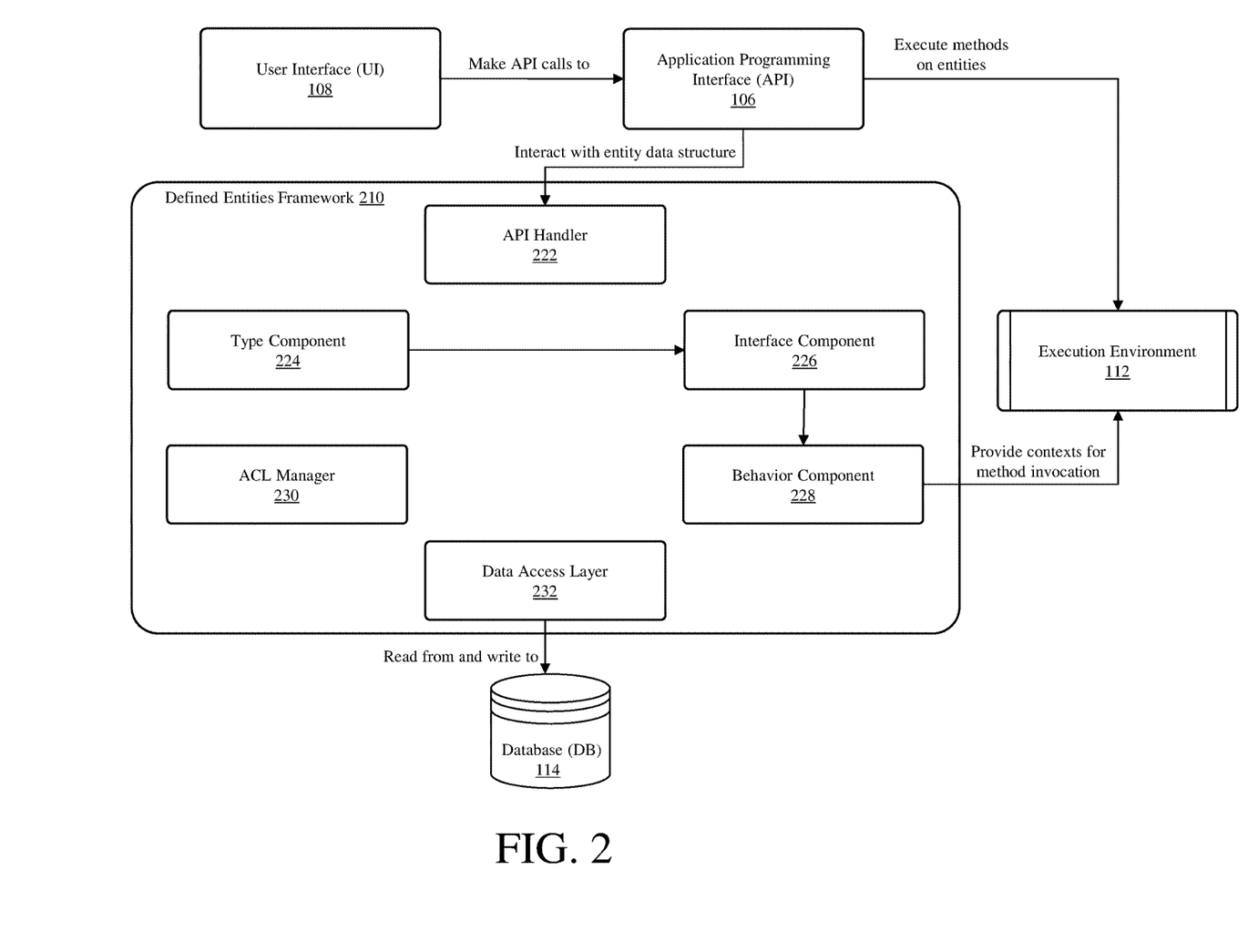
FIG. 2 is a block diagram of a defined entities framework in which embodiments of the invention may be implemented in accordance with various aspects of the invention.

Turning now to FIG. 2, a block diagram of a defined entities framework 210 in which embodiments of the present invention may be implemented in accordance with various aspects of the invention. The defined entities framework 210 depicted in FIG. 2 is an embodiment of the defined entities framework 110 depicted in FIG. 1. However, the defined entities framework 110 depicted in FIG. 1 is not limited to the embodiment depicted in FIG. 2. In the embodiment depicted in FIG. 2, the defined entities framework 210 includes at least one API handler 222, at least one type component 224, at least one interface component 226, at least one behavior component 228, at least one access control list (ACL) manager 230, and at least one data access layer 232. The defined entities framework 210 is configured to allow the operator 104 to provision one or more software or computing entities and/or install and execute various software services and/or applications in the software or computing entities. The defined entities framework 210 may be implemented in hardware (e.g., circuits), software, firmware, or a combination thereof. For example, the API handler 222, the type component 224, the interface component 226, the behavior component 228, the ACL manager 230, and/or the access layer 232 may be implemented using one or more software programs that reside and execute in one or more computer systems, such as one or more computer hosts. Although the defined entities framework 210 is shown in FIG. 2 as including certain elements, in other embodiments, the defined entities framework 210 may include more or less additional components to implement more or less additional functionalities.

In the embodiment depicted in FIG. 2, the API handler 222 is configured to receive user inputs on defined entity data structure from the API 106. The API 106 may directly receive inputs from the operator 104 to create and manage one or more defined software or computing entity types and defined entity behaviors or indirectly receive inputs from the operator 104 through the UI 108 (e.g., via API calls) to create and manage one or more defined software or computing entity types and defined entity behaviors. The API 106 may execute methods (e.g., operations) on one or more defined software or computing entities in the execution environment 112.

In the embodiment depicted in FIG. 2, the type component 224 is configured to contain at least one defined entity type, which may define at least one data schema to which at least one defined software entity adheres and operations that can be performed on the at least one defined software entity (e.g., indirectly through interface associations). The data schema for a defined entity type can be used to provides a rich querying experience with filtering and sorting capabilities that are on par (or even better than) the query capabilities available for built-in entity types. In some embodiments, a defined entity type describes the structure and behaviors of one or more defined computing entities. Behaviors may be defined for an entity type by associating one or more interfaces with the entity type. In some embodiments, a structure is defined directly on an entity type as a schema that represents what fields and/or attributes is present in a defined computing entity, as well as the data types, cardinality, and optionality of the fields. The schema may be represented in some well-known format (e.g., JavaScript Object Notation (JSON), YAML, etc.) and leverage existing tooling (e.g., json-schema, OpenAPI, etc.) to validate and parse data in defined computing entities against the schema. In some embodiments, defined entity types are versioned. For example, semantic versioning and its rules for managing version numbers may be used, which can account for enforcement of the semantic versioning (SemVer) version string format. The defined entity type version may be independent of the versions of its interfaces. A defined entity type's version may change when either its schema changes or if any of its interface associations change. In some embodiments, defined entity types themselves are identifiable as entities. In some embodiments, a defined computing entity is an instance of an entity type. For example, if "SDDC" (SDDC stands for software-defined data center) is the defined entity type, instances named "sddc-customer-a-east" and "sddc-customer-a-west" are example instances of that defined entity type. In some embodiments, a defined computing entity can be of multiple entity types. In some embodiments, a defined computing entity can be of exactly one entity type. In these embodiments, the data model comes directly from the schema defined on the type and its allowed behaviors come indirectly from the interfaces associated with that type. In some embodiments, defined computing entities allow metadata key/value pairs to be defined on a per-entity basis.

In the embodiment depicted in FIG. 2, the interface component 226 is configured to contain at least one entity interface, which may be configured to define a reference implementation. In some embodiments, the at least one entity interface is used to group similar entities together and to provide a contract for operations (e.g., behaviors). In some embodiments, conceptually similar to an interface in Java, an interface for defined computing entities represents a reference entity type with a collection of behavior information. An interface may contain any number of methods (e.g., operations), including zero. An interface with zero method may have a value as a "marker" interface, which is a structure that can be used to infer a logical relationship between defined entity types that implement a common interface. Interfaces may be versioned. For example, semantic versioning and its rules for managing version numbers may be used, which can account for enforcement of the SemVer version string format. Interfaces may deal only with behaviors and not deal with attributes or the data structure of an entity. In some embodiments, interfaces are all discrete objects and there is no hierarchy to interfaces. For example, if a defined entity type is both an SDDC and a vSphereSDDC (representing VMware vSphere® SDDC), there are two distinct interfaces representing those two distinct reference types. Interfaces are assignable to defined entity types. In some embodiments, multiple interfaces are assigned to one defined entity type.

In the embodiment depicted in FIG. 2, the behavior component 228 is configured to contain at least one entity behavior, which may be configured to define a behavior of a software entity. The entity behavior may be an executable operation that can be performed on a software entity. In some embodiments, the behavior component 228 is configured to provide contexts for method invocation to the execution environment 112. In some embodiments, behaviors are operations that can be invoked to defined computing entities. The invocation of behaviors may apply only to their existence on a defined computing entity. In some embodiments, the association of a behavior with an interface or with a defined entity type is not an executable construct. A behavior may be defined by an identifier or name for an operation to perform, possible input parameters for the operation, and a mechanism for executing the operation. Some example of possible ways to execute an operation include, but are not limited to, loosely coupled message bus interaction, webhooks, VMware vRealize® Orchestrator™ (vRO) workflow execution, and lambda execution.

In some embodiments, interfaces, defined entity types, and defined computing entities are all identifiable to an end user via reference identifiers such as EntityRef. Behaviors do not need to be identifiable as an EntityRef because behaviors only exist in the context of an interface. In some embodiments, information needed to uniquely identify an interface or a defined entity type are vendor, namespace specific string (nss), and version. A defined computing entity needs this information and a unique object identification (ID). Since interfaces and defined entity types can be versioned, and since multiple versions of these constructs can exist at the same time, the EntityRef needs to be enhanced to include version information. One way to achieve this in a manner that is backward compatible with existing EntityRefs and with existing code for converting between EntityRefs and Uniform Resource Names (URNs) is to model the version information in the style of Life Science Identifier (LSID): with an optional version indicated at the end of the URN (e.g., <Authority>:<Namespace>:<ObjectID>[:<Version>]). In this manner, existing entities that are not currently implemented using the defined entities framework continue to be represented exactly the same way. Any interfaces and defined entity types may have a version, and this enhancement to the EntityRef URN format can disambiguate the data when multiple versions of these object coexist.

Since interfaces and defined entity types can be versioned and multiple versions of these object can exist simultaneously, to ensure a high level of data consistency and meet expectations with respect to compatibility of data and behaviors of a defined computing entity, restrictions can be enforced on how and when interfaces and defined entity types can be modified. In some embodiments, a defined entity type or interface can be modified if and only if there are no defined computing entities of the type to be modified (directly) or implementing the interface to be modified (indirectly through the type). Properties that must adhere to this mutability rule may include the version numbers, the schema of a defined entity type, the behaviors of an interface, the interfaces associated with a defined entity type, and any URN fragments used to identify these objects as an EntityRef. Properties that do not need these strict mutability requirements may include user-facing context about the objects, such as name and description.

In the embodiment depicted in FIG. 2, the ACL manager 230 is configured to control the access to at least one defined computing entity, at least one entity type, and/or at least one interface. In the embodiment depicted in FIG. 2, the data access layer 232 is configured to read from the DB 114 and write to the DB 114. Access to create and manage interfaces and defined entity types may be driven by rights. In some embodiments, all users are able to access interfaces and defined entity types. For example, if defined type A and interface X exist in a computing system, all users in the computing system are able to see that these entities exist, though only a privileged subset of the users are able to work with instances of those interface and type. In some embodiments, the scope of an interface is denoted as provider-visible, tenant-visible, or both, which can enable defined computing entities to replace existing entities, such as hosts or external networks without leaking new information to tenant users, even accounting for the expansion of personas beyond tenant and provider. In some embodiments, a user has access to a defined computing entity (e.g., a VM) to view its details, or to power it on, but not to change hardware size or delete it. In these embodiments, it is not the entity itself (or the entity type or interface) that is the correct granularity for defined ACL rules, but the behaviors of the entity. In some embodiments, every time a defined entity type is created, a common set of rights are automatically created for that defined entity type, which creates a consistent and expected ACL experience between all defined computing entities.

In some embodiments, the defined entities framework 210 (e.g., the type component 224) is configured to automatically create and manage at least one right for each software entity type and at least one level of access control for both users and administrators. For example, a granular set of rights may be automatically created and managed for each entity type to allow for a flexible model of tenant entitlement and monetization, as well as five distinct levels of access control for both users (e.g., read, read/write or full control for users) and administrators (read or modify for administrators). In addition to or alternative to tenant entitlement, access can be granted with principal types for one or more rights, or with a membership-based principal type including specific users and groups. The mapping between rights and behaviors is customizable, which allows cloud providers to tailor the functionality to different tiers of service. In some embodiments, a behavior of a software entity represents an executable operation consisting of an operation definition (e.g., its name, inputs, and outputs) and an operation binding (e.g., the type of execution and actual logic to be executed). The characteristic of a behavior of a software entity allows execution of the software entity to be completely decoupled from a computing platform. Consequently, the execution environment 112 can leverage existing code-based solutions, for example, webhooks or serverless functions, or even code-free executions like Business Process Management (BPM) processes and workflows. At the same time, the consumption of this operation by an end user can be the same RESTful API experience that is provided for executing operations on built-in software entities.

Figure 3:
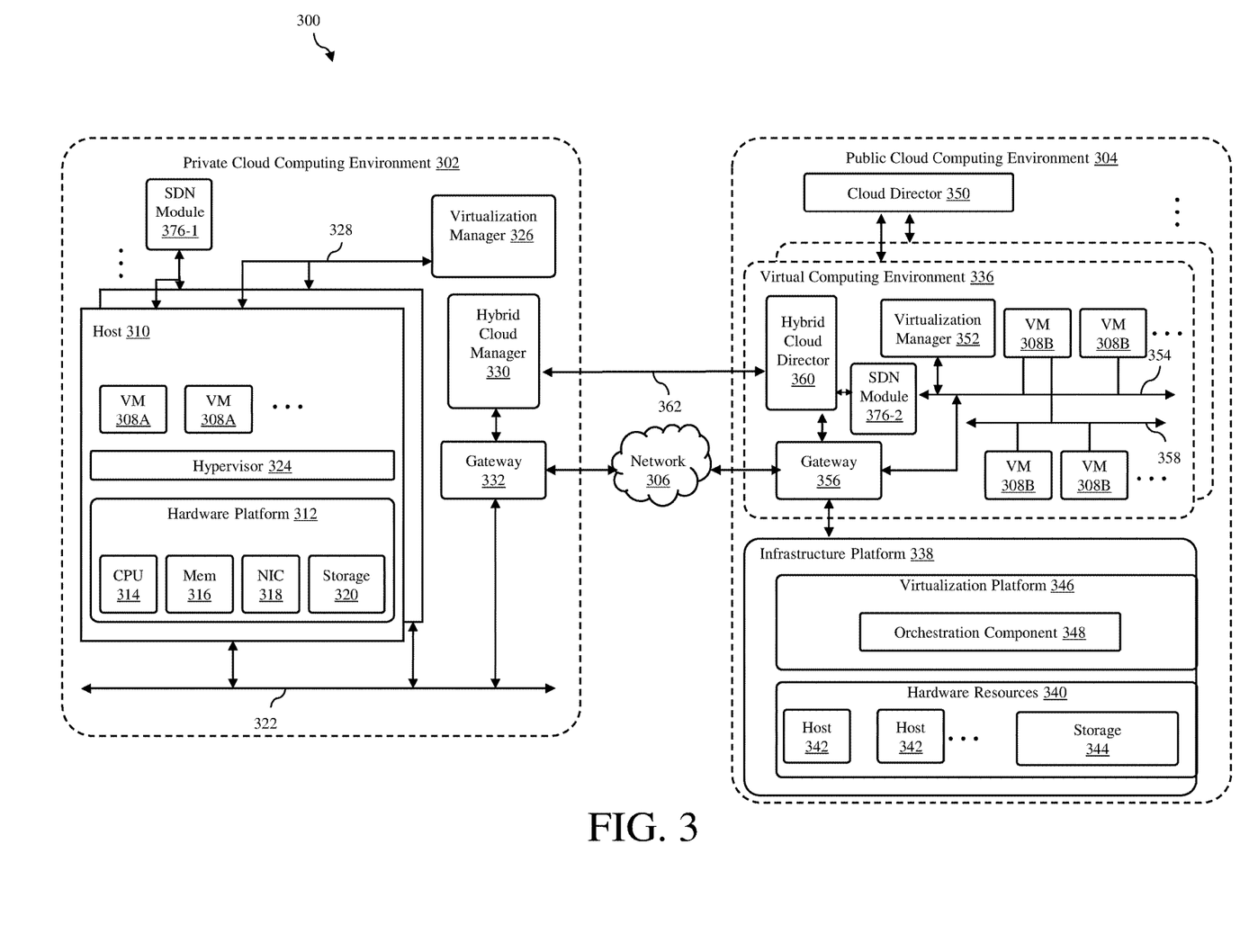
FIG. 3 is a block diagram of a hybrid cloud system in which embodiments of the invention may be implemented in accordance with various aspects of the invention.

Turning now to FIG. 3, a block diagram of a hybrid cloud system 300 in which embodiments of the invention may be implemented in accordance with various aspects of the invention is shown. In the embodiment depicted in FIG. 3, the hybrid cloud system 300 includes at least one private cloud computing environment 302 and at least one public cloud computing environment 304 that are connected via a network 306. The hybrid cloud system 300 is configured to provide a common platform for managing and executing commands, instructions, and/or workloads seamlessly between the private and public cloud computing environments. In one embodiment, the private cloud computing environment 302 may be controlled and administrated by a particular enterprise or business organization, while the public cloud computing environment 304 may be operated by a cloud computing service provider and exposed as a service available to account holders, such as the particular enterprise in addition to other enterprises. In some embodiments, the private cloud computing environment 302 may be a private or on-premises data center. The hybrid cloud system can be used in cloud computing and cloud storage systems for offering software as a service (SaaS) cloud services.

The private cloud computing environment 302 and the public cloud computing environment 304 of the hybrid cloud system 300 include computing and/or storage infrastructures to support a number of virtual computing instances 308A and 308B in the form of virtual machines.

Continuing to refer to FIG. 3, the private cloud computing environment 302 of the hybrid cloud system 300 includes one or more host computer systems ("hosts") 310. The hosts may be constructed on a (e.g., server-grade) hardware platform 312, such as an x86 architecture platform. As shown, the hardware platform of each host may include conventional components of a computing device, such as one or more processors (e.g., CPUs) 314, system memory 316, a network interface 318, storage system 320, and other I/O devices such as, for example, a mouse and a keyboard (not shown). The processor 314 is configured to execute instructions such as, for example, executable instructions that may be used to perform one or more operations described herein and may be stored in the memory 316 and the storage system 320. The memory 316 is volatile memory used for retrieving programs and processing data. The memory 316 may include, for example, one or more random access memory (RAM) modules. The network interface 318 enables the host 310 to communicate with another device via a communication medium, such as a network 322 within the private cloud computing environment. The network interface 318 may be one or more network adapters, also referred to as a Network Interface Card (NIC). The storage system 320 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 320 is used to store information, such as executable instructions, cryptographic keys, virtual disks, configurations and other data, which can be retrieved by the host.

Each host 310 may be configured to provide a virtualization layer that abstracts processor, memory, storage, and networking resources of the hardware platform 312 into the virtual computing instances, e.g., the virtual machines 308A, that run concurrently on the same host. The virtual machines run on top of a software interface layer, which is referred to herein as a hypervisor 324, which enables sharing of the hardware resources of the host by the virtual machines. One example of the hypervisor 324 that may be used in an embodiment described herein is a VMware ESXi™ hypervisor provided as part of the VMware vSphere® solution made commercially available from VMware, Inc. The hypervisor 324 may run on top of the operating system of the host or directly on hardware components of the host. For other types of virtual computing instances, the host may include other virtualization software platforms to support those virtual computing instances, such as Docker virtualization platform to support software containers.

The private cloud computing environment 302 may include a virtualization manager 326 that communicates with the hosts 310 via a management network 328 and a software-defined network (SDN) module 376-1 that manages network virtualization in the private cloud computing environment 302. In one embodiment, the virtualization manager 326 is a computer program that resides and executes in a computer system, such as one of the hosts, or in a virtual computing instance, such as one of the virtual machines 308A running on the hosts. One example of the virtualization manager 326 is the VMware vCenter Server® product made available from VMware, Inc. The virtualization manager 326 is configured to carry out administrative tasks for the private cloud computing environment, including managing the hosts, managing the virtual machines running within each host, provisioning virtual machines, migrating virtual machines from one host to another host, and load balancing between the hosts.

In one embodiment, the private cloud computing environment 302 includes a hybrid cloud manager 330 configured to manage and integrate computing resources provided by the private cloud computing environment 302 with computing resources provided by the public cloud computing environment 304 to form a unified "hybrid" computing platform. The hybrid cloud manager is configured to deploy virtual computing instances, e.g., virtual machines 308A, in the private cloud computing environment, transfer virtual machines from the private cloud computing environment to the public cloud computing environment 304, and perform other "cross-cloud" administrative tasks. In one implementation, the hybrid cloud manager 330 is a module or plug-in to the virtualization manager 326, although other implementations may be used, such as a separate computer program executing in any computer system or running in a virtual machine in one of the hosts.

In one embodiment, the hybrid cloud manager 330 is configured to control network traffic into the network 306 via a gateway 332, which may be implemented as a virtual appliance. The gateway 332 is configured to provide the virtual machines 308A and other devices in the private cloud computing environment 302 with connectivity to external devices via the network 306. The gateway 332 may manage external public Internet Protocol (IP) addresses for the virtual machines 308A and route traffic incoming to and outgoing from the private cloud computing environment and provide networking services, such as firewalls, network address translation (NAT), dynamic host configuration protocol (DHCP), load balancing, and virtual private network (VPN) connectivity over the network 306.

The public cloud computing environment 304 of the hybrid cloud system 300 is configured to dynamically provide an enterprise (or users of an enterprise) with one or more virtual computing environments 336 in which an administrator of the enterprise may provision virtual computing instances, e.g., the virtual machines 308B, and install and execute various applications in the virtual computing instances. The public cloud computing environment 304 includes an infrastructure platform 338 upon which the virtual computing environments can be executed. In the particular embodiment of FIG. 3, the infrastructure platform 338 includes hardware resources 340 having computing resources (e.g., hosts 342), storage resources (e.g., one or more storage array systems, such as a storage area network (SAN) 344), and networking resources (not illustrated), and a virtualization platform 346, which is programmed and/or configured to provide the virtual computing environments 336 that support the virtual machines 308B across the hosts 342. The virtualization platform 346 may be implemented using one or more software programs that reside and execute in one or more computer systems, such as the hosts 342, or in one or more virtual computing instances, such as the virtual machines 308B, running on the hosts.

In one embodiment, the virtualization platform 346 includes an orchestration component 348 that provides infrastructure resources to the virtual computing environments 336 responsive to provisioning requests. The orchestration component may instantiate virtual machines according to a requested template that defines one or more virtual machines having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 302, the virtualization platform may be implemented by running on the hosts 342 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 304.

In one embodiment, the public cloud computing environment 304 may include a cloud director 350 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 348 to instantiate the requested virtual machines (e.g., the virtual machines 308B). One example of the cloud director is the VMware Cloud Director® product from VMware, Inc. The public cloud computing environment 304 may be VMware Cloud™ (VMC) on Amazon Web Services (AWS).

In one embodiment, at least some of the virtual computing environments 336 may be configured as software-defined data centers (SDDCs). Each virtual computing environment includes one or more virtual computing instances, such as the virtual machines 308B, an SDN module 376-2 configured to manage network virtualization of the virtual computing environment, and one or more virtualization managers 352. The virtualization managers 352 may be similar to the virtualization manager 326 in the private cloud computing environment 302. One example of the virtualization manager 352 is the VMware vCenter Server® product made available from VMware, Inc. Each virtual computing environment may further include one or more virtual networks 354 used to communicate between the virtual machines 308B running in that environment and managed by at least one networking gateway 356, as well as one or more isolated internal networks 358 not connected to the gateway 356. The gateway 356, which may be a virtual appliance, is configured to provide the virtual machines 308B and other components in the virtual computing environment 336 with connectivity to external devices, such as components in the private cloud computing environment 302 via the network 306. The gateway 356 operates in a similar manner as the gateway 332 in the private cloud computing environment.

In one embodiment, each virtual computing environment 336 includes a hybrid cloud director 360 configured to communicate with the corresponding hybrid cloud manager 330 in the private cloud computing environment 302 to enable a common virtualized computing platform between the private and public cloud computing environments. The hybrid cloud director may communicate with the hybrid cloud manager using Internet-based traffic via a VPN tunnel established between the gateways 332 and 356, or alternatively, using a direct connection 362. The hybrid cloud director and the corresponding hybrid cloud manager facilitate cross-cloud migration of virtual computing instances, such as virtual machines 308A and 308B, between the private and public computing environments. This cross-cloud migration may include both "cold migration" in which the virtual machine is powered off during migration, as well as "hot migration" in which the virtual machine is powered on during migration. As an example, the hybrid cloud director 360 may be a component of the HCX-Cloud product and the hybrid cloud manager 330 may be a component of the HCX-Enterprise or HCX-connector product, which is provided by VMware, Inc.

In some embodiments, the computing module 102 (e.g., the defined entities framework 110) is implemented within the private cloud computing environment 302 and/or the public cloud computing environment 304 of the hybrid cloud system 300. In an embodiment, the defined entities framework 110 is implemented within the cloud director 350 of the public cloud computing environment 304, which may be the VMware Cloud Director product from VMware, Inc. In the cloud director 350, the term "entities" may refer to objects that users can create, manage, and interact with, such as, VMs, organizations, users, and provider virtual data centers. Entity instances can be represented as a unique identifier (e.g., URN) within the cloud director 350, and have common characteristics such as name, type, and ownership. The intent of defined computing entities is to allow the known set of entities to be easily extended, with consistent treatment of the entities in terms of ACL management, entity identification and resolution, metadata, and other common characteristics. The definitions of these entities are not only available to developers or administrators of the cloud director as a pattern of development or a framework to add new entity types but also are available to users of the hybrid cloud system 300, to define new types of entities at runtime, which can leverage these patterns and the framework to deliver service integrations and other differentiated offerings into a platform.

In some embodiments, software-defined data centers (SDDCs), which are a combination of networking, compute, and storage delivered as virtual resources, typical in an "as a Service" way, are represented by defined computing entities. In some embodiments, interfaces represent an SDDC and a vSphere SDDC. An SDDC itself may be a run-time defined entity, and the cloud director 350 manages searching, entitlements and validation for instances. For example, in the cloud director 350, an SDDC may be a Virtual Datacenter—a tenant-scoped collection of resources within a vSphere-based infrastructure. It is also possible for a service provider to deliver the vSphere infrastructure itself (e.g., rather than cloud director's pure virtual abstraction over vSphere) to tenants as a "dedicated vSphere data center". In addition to vSphere-based infrastructure, a hybrid cloud or multi-cloud platform may also be able to represent other types of infrastructure as an SDDC. For example, VMware Cloud (VMC), VMware Cloud Foundation (VCF), container clusters, or Amazon Virtual Private Cloud (VPC) or Elastic Compute Cloud (EC2™) all can represent types of SDDCs. The cloud director 350 needs to represent different characteristics that are potentially related, to provide resource utilization views in an aggregated way. In addition, the cloud director 350 also needs to know that each type of infrastructure is a specialized object that may have its own specific behaviors. A vSphere-backed SDDC for instance may require life cycle management to set maintenance windows and upgrade agents, but these operations may not be relevant to a VMC-based SDDC. A service provider may need to be able to make an SDDC available to a single tenant, and a tenant administrator may need to further restrict access to that SDDC to a specific type of tenant user. The operations that are available to an SDDC may also be access-controlled. A provider may be able to perform operations such as "set maintenance window" or "apply patch". A tenant may not necessarily be given access to those operations, but may instead to be able to "view usage," "open UI," or "view VM consoles". In some embodiments, as a list of requirements, SDDCs may need the ability to represent different types of virtual resource collections as SDDCs, the ability to distinguish between different types of virtual resource collections as specialized SDDCs, the ability to define a set of operations on SDDCs and specialized SDDCs, the ability to allow access to an SDDC to be specified to a tenant and to a user, and/or the ability to allow access to specific operations of an SDDC to be specified to a tenant and to a user.

In some embodiments, container clusters, which are the generic term for container orchestration platforms such as Kubernetes (K8S), are represented by defined computing entities. Customers can use CSE to create native Kubernetes clusters based on VM provisioned from Virtual Datacenters. The cloud director 350 can offer a consistent way to represent tenant-owned container clusters, regardless of the provider of those clusters, as well as allowing each provider to expose the capabilities that they can uniquely provide. In general, the cloud director 350 may provide ACL-limited API access to vet information about a cluster and the resources it consumes, get a configuration file to allow access to the cluster, and/or delete a cluster. Each provider can augment the basic container cluster API with its own capabilities, such as parameterized cluster creation, expansion or contraction of a cluster by adding or removing nodes, and/or lifecycle operations like suspending, powering off, and powering on.

In some embodiments, defined computing entities are used in protection policies. For example, as a list of requirements, protection policies need the ability to be defined at runtime, both as a data structure and as a set of operations, the ability to be associated with other objects in the hybrid cloud system 300, such as virtual application container (vApps) and VMs, the ability to define "scheduled" behaviors for an association, such as "execute a backup on VM1 every 4 hours," and/or the ability to be granted to specific tenants, and possibly users. Defined computing entities may also be used in vApps/VMs and Functions as a Service.

In some embodiments, computing entities are defined during a development process. In other embodiments, computing entities are defined at runtime. Versioning (e.g., SemVer) on entity definitions may be mandated. In some embodiments, a per-definition schema that dictates the data structure that an instance of a defined computing entity must adhere to in terms of named fields, data types, required data indications, etc., is defined and supported. For example, a defined computing entity instance representing an SDDC may have a name string and an enabled Boolean flag, and may optionally contain a description string. In some embodiments, created or updated instances of computing entities are validated against the defined computing entities' schemas. A grouping or relationship may exist between multiple defined computing entities. For example, Kubernetes, PKS, Mesos, and ECS are four different defined computing entities that all represent a container cluster. Container Cluster may be a searchable group that includes instances from all four entities. Grouped or related entities may be allowed to define common behaviors. In some embodiments, instances of defined computing entities support metadata.

In some embodiments, entity access is implemented to enforce ACL-based authorization to defined computing entities and defined entity types/definitions and/or ensure consistency with existing principal types (e.g., user, tenant, right, etc.) in the cloud director. In some embodiments, client interaction is implemented to prevent defined computing entities created at build time from being modified/deleted and/or to allow users to create, update, and delete defined computing entities according to one or more pre-defined goals. In some embodiments, a predictable API experience is provided for operations such as querying for all entity groups, querying for defined computing entities that are part of a group, querying for instances of a defined computing entity, querying for defined computing entity instances that are part of a group, and executing behaviors (e.g., with optional input parameters) on defined computing entities.

In some embodiments, defined entity types themselves are identifiable as entities, for example, in the cloud director 350 according to the cloud director's existing EntityRef and entity resolution patterns. Defined computing entities may be identifiable as entities according to the cloud director's existing EntityRef and entity resolution patterns. In some embodiments, access to defined computing entities are controlled by cloud director's existing constructs for rights and ACLs. Interfaces themselves may be identifiable as entities in the cloud director according to the cloud director's existing EntityRef and entity resolution patterns. In some embodiments, the "level of access" that the cloud director currently allows for an entity is driven by a sharing role.

In some embodiments, one or more APIs are used to retrieve interfaces and defined entity types. For example, looking up interfaces and defined entity types may be a fairly straightforward experience that models API in terms of collection versus instance retrieval and sorting/filtering. In some embodiments, a specific instance is identified by each of interfaces and defined computing entities based on their unique EntityRef information of type (represented as a namespace-specific string or nss) and version. Some examples of URLs to access interfaces and/or defined computing entities are shown in Table 1 below. The URLs shown in Table 1 may assume the existence of an interface with an nss and version of "sddc" and "2.0.0", and a defined entity type with an nss and version of "sddc" and "1.5.0".

If a provider is assumed to be the only one that can create defined entities, there may be little concern for collision of the namespace-specific string and version tuple. However, this may be a bad assumption. For example, partners and third party vendors may want to deliver solutions that make use of defined computing entities and the collision problem may become much harder to control. In some embodiments, a "policy" interface or entity type is created. To mitigate the collision problem, a vendor slug can be added to the interfaces and entity types as a field that is far less likely to incur duplication across third parties, and that field can be included in the tuple with nss and version, which can eliminate burden on the cloud director administrators to ensure uniqueness across all third party integrations. The burden on the solution engineer may be to select a unique vendor slug, and then ensure that all custom entities within that vendor are unique with respect to nss and version, which is a reasonable expectation. In this case, the APIs listed above may contain the additional vendor slug as identifying information. The format may be similar to, but not necessarily in the exact style of, the following:

/cloudapi/1.0.0/interfaces/urn:vcloud:interface:acme.policy: 1.0.0

/cloudapi/1.0.0/interfaces/acme.policy/1.0.0

In some embodiments, to retrieve defined computing entities, a generic entity resolver API that already exists in the cloud director 350 can be used in a generic and consistent way when the identification (ID) of that entity is known. In the case that entities have a unique identifier that is unknown, looking up entities may start from a constrained search on either the interface or the defined entity type. With that guiding principle, a type-based lookup becomes simply a matter of adding dynamic API path capabilities to the entity identifier that is unique to the cloud director system. For example, given a cloud director-defined computing entity with the unique tuple {nss: sddc, version: 1.0.0} and a vendor-defined computing entity of {vendor: acme, nss: policy, version: 1.0.0}, then the following API calls in Table 2 below can be used.

TABLE 1

| Verb | URL | Description |
|---|---|---|
| GET | /cloudapi/1.0.0/interfaces | Gets the collection of interfaces defined in the cloud director instance. Allows collection refinement through traditional Feed Item Query Language (FIQL)-based filtering |
| GET | /cloudapi/1.0.0/interfaces/urn:vcloud: interface:sddc:1.0.0 | Gets the interface with the unique identifier (URN) |
| GET | /cloudapi/1.0.0/interfaces/acme.policy/1.0.0 | (Optional) Gets the interface by unique combination of vendor, nss fragment and version |
| GET | /cloudapi/1.0.0/entityTypes | Gets the collection of entity types defined in the cloud director instance. Allows collection refinement through traditional FIQL-based filtering |
| GET | /cloudapi/1.0.0/entityTypes/urn:vcloud:type: acme.policy:1.5.0 | Gets the entity type with the unique identifier (URN) |
| GET | /cloudapi/1.0.0/entityTypes/sddc/1.0.0 | (Optional) Gets the entity type by unique combination of vendor, nss fragment and version |

TABLE 2

| Verb | URL | Description |
| --- | --- | --- |
| GET | /cloudapi/1.0.0/entities/urn:vcloud:<vendor>.<nss>:<version>:<id> | Gets a single instance of a defined computing entity. |
| GET | /cloudapi/1.0.0/entities/vcenterSddc/1.0.0 | Gets the collection of defined computing entities for the cloud director-defined type with the specified nss and version. Allows collection refinement through traditional FIQL-based filtering driven from the schema of the defined entity type |
| GET | /cloudapi/1.0.0/entities/acme.policy/1.0.0 | Gets the collection of defined computing entities for the vendor-defined type with the specified vendor, nss, and version. Allows collection refinement through traditional FIQL-based filtering driven from the schema of the defined entity type |

The expectation is that any of the above calls in Table 2 may return a collection of entities of the same defined entity type, having the same data schema and behaviors. In addition to the above type-based lookup, an interface-based lookup may also be useful (for example, "I want to find entities that behave like a container cluster whether they are a Workload Control Plane (WCP) cluster type, or a K8S cluster type"). In this case, a different API structure than Table 2 must be used, because there is no enforcement of uniqueness across both entity types and interfaces with respect to nss, which leads to requests like /cloudapi/1.0.0/entities/containerCluster being ambiguous if there is both an interface and a defined entity type with an nss of "container-Cluster". Two examples of an API path that keeps the same consistent root to set expectation of returned objects, but eliminates ambiguity are listed in Table 3.

In some embodiments, to interact with defined computing entities, updating the schema of a defined computing entity is a PUT request to the same endpoint as the entity's GET. Invocation of methods on an entity (as defined in an entity's behaviors) may be a POST to an /invoke path from the entity's GET path: POST/cloudapi/1.0.0/entities/vcenterSddc/1.0.0/a08a8798-7d9b-34d6-8dad-48c7182c5f66/invoke, where the method name and input parameters are specified in a request body. Alternatively, the method name can be given in the URL path as a query parameter.

Entity definition may be implemented using different algorithms. A pseudo-code for a particular implementation of the entity definition procedure in accordance with an embodiment of the invention is shown below. The following steps are written as a runtime defined computing entity to

TABLE 3

| Verb | URL | Description |
| --- | --- | --- |
| GET | /cloudapi/1.0.0/entities/interfaces/sddc/1.0.0 | Gets the collection of defined computing entities for the cloud director-defined interface with the specified nss and version. Since interfaces do not define additional data fields, the availability of FIQL-based refinement is at best very limited. |
| GET | /cloudapi/1.0.0/entities/interfaces&filter=<FIQL> | Gets a collection of defined computing entities for the filtered set of interfaces. This endpoint can return a collection of entities with differing interfaces and behaviors. The filter may have some addition requirements: it is not optional. filter parameter must be present and non-empty filtering can be performed on the following combinations of nss, vendor, and version (at least one of nss or vendor is required): nss (exact match) nss (exact match) and version vendor (exact match) vendor (exact match) and version nss (exact match), vendor (exact match), and version | show the mapping of APIs to functionality. However, all of management of interfaces, behaviors, and defined entity types can also be done at build time via direct DB insertion.

```
Define an Entity
1. Define an Interface
POST /cloudapi/1.0.0/interfaces
Request Body:
{
   "vendor": "vendorA",
   "name": "Foo Interface",
   "version": "1.0.0",
   "nss": "foo"
}
Result:
/cloudapi/1.0.0/interfaces/urn:vcloud:interface:vendorA.foo:1.0.0
2. [Optional]: Define Behaviors for Interface
POST /cloudapi/1.0.0/interfaces/urn:vcloud:interface:vendor
A.foo:1.0.0/behaviors
Request Body:
{
   "method": { "name": "getA"},
   "execution": {
      "type": "vro",
      "workflowName": "workflowA"
   }
}
Result:
/cloudapi/1.0.0/interfaces/urn:vcloud:interface:vendorAfoo:1.0.0/behaviors/getA
POST /cloudapi/1.0.0 /interfaces/urn:vcloud:interface:vendor
A.foo:1.0.0/behaviors
Request Body:
{
   "method": { "name": "doB"},
   "execution": {
      "type": "function",
      "trigger": "urn:vcloud:trigger:1"
   }
}
Result:
/cloudapi/1.0.0/interfaces/urn:vcloud:interface:vendorA.foo:1.0.0/behaviors/doB
3. Define an Entity Type
POST /cloudapi/1.0.0/entityTypes
Request Body:
{
   "vendor": "vendorA",
   "name": "Foo Type",
   "version": "1.0.0",
   "nss": "foo",
   "interfaces": ["urn:vcloud:interface:vendorA.foo:1.0.0"],
   "schema": {
      "properties": {
         "id": {
            "$ref": "#/definitions/vcloudId"
         },
         "name": {
            "type": "string"
         },
         "items": {
            "type": "array",
            "minItems": 1,
            "items": {
               "type": "string"
            }
         }
      }
   }
}
Result:
/cloudapi/1.0.0/entityTypes/urn:vcloud:type:vendorAfoo:1.0.0
Note:
- 3 new rights created by default for entity type 'foo'. These will represent view/read, read and write, and full control entitlements.
- these rights are added to the corresponding sharing role
- these rights are added to a new rights bundle
- a built-in behavior will be implied for each type without being explicitly defined on an interface. This built-in behavior (updateEntity) will be used to entitle access to modify the data fields of an entity, which is not explicitly
behavior-driven.
- a second built-in behavior (createEntity) will be implied for each type to entitle creating
``` entity instances of this type
4. Define Entity Access
GET /cloudapi/1.0.0/entityTypes/urn:vcloud:type:vendorA.foo
:1.0.0
Return:
{
  "vendor": "vendorA",
  "name": "Foo Type",
  "version": "1.0.0",
  "nss": "foo",
  "interfaces": [
    {
      "vendor": "vendorA",
      "name": "Foo Interface",
      "version": "1.0.0",
      "nss": "foo",
      "behaviors": [
        "/cloudapi/1.0.0/interfaces/urn:vcloud:interface:vendorA.foo:1.0.0/behaviors/getA",
        "/cloudapi/1.0.0/interfaces/urn:vcloud:interface:vendorA.foo:1.0.0/behaviors/doB"
      ]
    }
  ]
}
POST /cloudapi/1.0.0/entityTypes/urn:vcloud:type:vendorA.foo:1.0.0/access
Request Body:
{[
  {
    "right": "<foo read right id>",
    "behaviors": [
      "/cloudapi/1.0.0/interfaces/urn:vcloud:interface:vendorA.foo:1.0.0/behaviors/getA"
    ]
  },
  {
    "right": "<foo read/write right id>",
    "behaviors": [
      "/cloudapi/1.0.0/interfaces/urn:vcloud:interface:vendorA.foo:1.0.0/behaviors/getA",
      "updateEntity"
    ]
  },
  {
    "right": "<foo full control id>",
    "behaviors": [
      "/cloudapi/1.0.0/interfaces/urn:vcloud:interface:venorA.foo:1.0.0/behaviors/getA",
      "/cloudapi/1.0.0/interfaces/urn:vcloud:interface:venorA.foo:1.0.0/behaviors/doB",
      "updateEntity",
      "createEntity"
    ]
  }
]}
Result:
20x - Done
Notes:
1. The end result of this call is to associate the specific rights with functionality. The resulting model persisted by the above call states that a user in a role that has the "Foo view/read" right will be able to invoke the getA behavior (method), but not the doB behavior, entity creation, or entity data update. A user in a role with the "Foo full control" right will be able to invoke all defined behaviors, as well as update data and create new instances. A "Foo read/write"-capable user will be able to invoke getA and update the instance's data, but not create new instances of foo or invoke doB. This ability to invoke assumes they have access to a specific entity instance of the foo type. Proper ACL handling should ensure that the creator of the entity instance is appropriately ACL'd for full control, and that they can share access to other users with one of the 3 built-in access levels.
2. These rights and this access control correspond to the entity instances, not the entity type itself The ability to create entity types and define access rules for those entity types (the above API calls) will be governed by a different set of rights.

At this stage (3 API calls), the system is in the following state:

An interface "Foo Interface" has been created. It supplies 2 explicit behaviors—getA and doB. Some of the complexity of defining the behaviors has been omitted from the above example.

An entity "Foo Type" has been created. It defines a schema that all entities of this type must adhere to, and it implements "Foo Interface" so that all entities of this type can perform getA and doB.

New rights have been created with placeholder names "View Foo Type", "Update Foo Type", "Fully Manage Foo Type".

The above rights have been added to the Sharing Roles with the corresponding Access Level (Read, Read/Write, Full Control).

A Rights Bundle "Foo Type Rights Bundle" has been created to easily add the entitlements for the defined entity type to a tenant. This rights bundle contains the above rights.

The explicit behavior getA has been added to all three of the above rights. The "Update Foo Type" right can additionally perform the implicit behavior, updateEntity. The "Fully Manager Foo Type" right can additionally perform the implicit behaviors, updateEntity and createEntity, and doB.

The system is now in a state where "Foo Interface" and "Foo Type" can be further managed, or instances of "Foo Type" can be created.

A pseudo-code for a particular implementation of an entity interface in accordance with an embodiment of the invention is shown below.

```
{
  "$schema": "http://json-schema.org/draft-07/schema#",
  "title": "SDDCs",
  "description": "Simplified JSON representation of SDDCs",
  "type": "object",
  "sddc": {
    "$ref": "#/definitions/Sddc"
  },
  "required": [
    "sddc"
  ],
  "additionalProperties": false,
  "definitions": {
    "vcloudId": {
      "title": "VCD Id",
      "description": "Id representation",
      "type": "object",
      "properties": {
        "id": {
          "type": "string",
          "format": "uri",
          "pattern": "^urn:vcloud:",
          "readOnly": true
        }
      }
    },
    "Sddc": {
      "title": "SDDC",
      "description": "A SDDC entity",
      "type": "object"",
      "properties": {
        "id": {
          "$ref": "#/definitions/vcloudId"
        },
        "name": {
          "type": "string"
        },
        "proxies": {
          "type": "array",
          "minItems": 1,
          "items": {
            "$ref": "#/definitions/SddcProxy"
          }
        },
        "description": {
          "type": "string"
        },
        "enabled": {
          "type": "boolean",
          "default": false
        }
      },
      "required": [
        "name",
        "proxies"
      ],
      "additionalItems": true
    },
    "SddcProxy": {
      "title": "SDDC Proxy",
      "description": "A SDDC Proxy entity",
      "type": "object",
      "properties": {
        "id": {
          "$ref": "#/definitions/vcloudId"
        },
        "targetUrl": {
          "type": "string",
          "format": "uri"
        },
        "uiUrl": {
          "type": "string",
          "format": "uri"
        },
        "enabled": {
          "type": "boolean",
          "default": false
        },
        "parentProxy": {
          "$ref": "#/definitions/SddcProxy"
        },
        "childrenProxies": {
          "type": "array",
          "$ref": "#/definitions/SddcProxy"
        }
      },
      "additionalItems": true,
      "additionalProperties": false
    }
  }
}
```

A use case for the embodiments of the invention described herein involves help desk tickets. Help desk tickets can be used by tenants to make service requests (e.g., deploying a new VM) or report issues (e.g., I cannot log in). A "Ticket" is not a known part of a computing system (e.g., the cloud director 350). In some embodiments, using runtime defined entities, a user can define a ticket type as:

```
Ticket {
  title: string,
  description: string,
  created: date,
  assignee: User,
  status: enum [NEW, ASSIGNED, RESOLVED, CLOSED, REOPENED]
}
```

By adding this runtime defined entity type (Ticket) to a cloud platform (e.g., the hybrid cloud system 300), users can create and interact with tickets. Because tickets are of a runtime defined entity, the cloud platform can automatically provide the following capabilities on the ticket:

ACL Management
   There may be no owner in the ticket definition such that the owner is managed by the cloud platform.
   Only the owner of this ticket or an admin has access to this ticket.
   The ticket is part of a tenant organization of a user and is not visible to other tenants.
   Fine-grained rights allow distinction between read only, read/write, and full control access.
Entitlement
   A cloud operator or provider can decide which tenants know about and/or can use a ticketing feature.
Searching
   Anyone with access to tickets can query for tickets based on information in the schema, such as, title, description, status, etc.
Updating
   A user with read/write or full control access to a Ticket can modify the data of that ticket.

In some embodiments, less visible to end users, data is all managed by the cloud platform such that a run-time defined entity can get the same treatment as built in entities with respect to redundancy, availability, sharding, etc.

If a user prefers performing operations (e.g., reopening, escalating, watching) on a ticket rather than only updating the data, behaviors can be used to define operations. For example, each of these operations may be represented as a behavior, and an interface can be used as the organizing group for behaviors. For example, an interface can be defined as:

```
TicketInterface {
    reopen( ): void
    escalate(newLevel: string): void
    watch( ): Ticket
    getWatchlist( ): User[ ]
}
```

If the above Ticket type implements TicketInterface, all instances of the Ticket type can perform those operations. The implementation of those behaviors doesn't need to be part of the cloud platform. For example, the behavior or behaviors instructs the cloud platform on how to invoke one or more operations, such as:
sending a request to a Slack webhook that notifies a specific channel that a ticket has been escalated;
publishing a message to an Advanced Message Queuing Protocol (AMQP) message broker to get all watchers of a ticket; and/or
call into an AWS lambda to reopen a previously resolved ticket in an external system.

Figure 4:
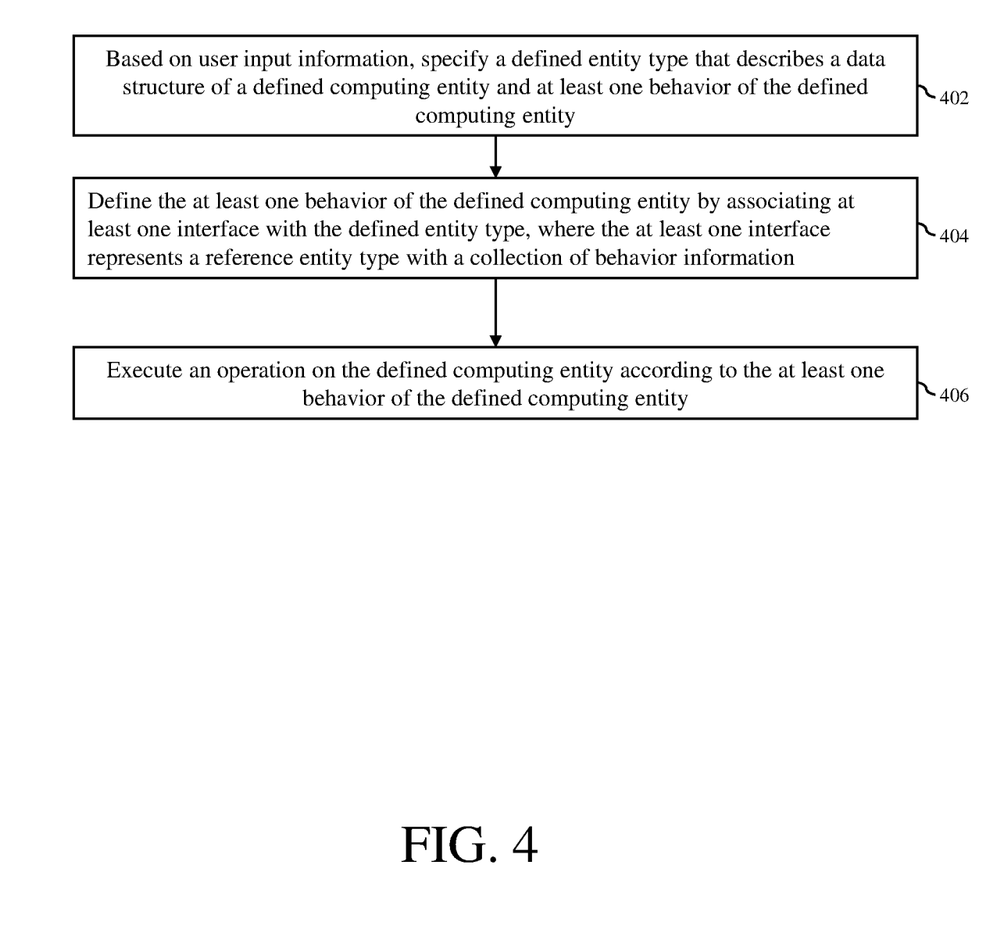
FIG. 4 is a flow diagram of a computer-implemented method in accordance with an embodiment of the invention.

A computer-implemented method in accordance with an embodiment of the invention is described with reference to a flow diagram of FIG. 4. At block 402, based on user input information, a defined entity type that describes a data structure of a defined computing entity and at least one behavior of the defined computing entity is specified. At block 404, the at least one behavior of the defined computing entity is defined by associating at least one interface with the defined entity type, where the at least one interface represents a reference entity type with a collection of behavior information. At block 406, an operation is executed on the defined computing entity according to the at least one behavior of the defined computing entity.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for using defined computing entities, the method comprising:
    based on user input information, creating a new defined entity type that describes a data structure of a defined computing entity and at least one behavior of the defined computing entity;
    automatically creating a set of rights for accessing the new defined entity type when the new defined entity type is created based on the user input information;
    defining the at least one behavior of the defined computing entity by associating at least one interface with the new defined entity type, wherein the at least one interface represents a reference entity type with a collection of behavior information; and
    executing an operation on the defined computing entity according to the at least one behavior of the defined computing entity.

2. The method of claim 1, further comprising instantiating the defined computing entity as an instance of the new defined entity type, wherein the defined computing entity has the data structure and exhibits the at least one behavior.

3. The method of claim 1, wherein executing the operation on the defined computing entity according to the at least one behavior of the defined computing entity comprises executing the operation on the defined computing entity in a hybrid cloud system according to the at least one behavior of the defined computing entity.

4. The method of claim 1, wherein the at least one behavior of the defined computing entity represents an executable operation having an operation definition and an operation binding.

5. The method of claim 4, wherein the operation definition comprises a name of the executable operation, input information of the executable operation, and output information of the executable operation, and wherein the operation binding comprises a type of execution of the executable operation and a logic to be executed for the executable operation.

6. The method of claim 1, wherein the data structure of the defined computing entity is defined as a data schema to which the defined computing entity adheres.

7. The method of claim 6, wherein the data schema represents at least one data field to be presented in the defined computing entity and data type information, cardinality information, and optionality information of the at least one data field.

8. The method of claim 1, wherein the defined computing entity comprises a run-time entity.

9. The method of claim 1, wherein the set of rights for accessing the new defined entity type defines a plurality of levels of access control of the new defined entity type by a user or an administrator.

10. The method of claim 1, further comprising receiving the user input information from a user through an application programming interface (API).

11. The method of claim 1, further comprising receiving the user input information from a user through a user interface (UI) and an application programming interface (API) coupled to the UI.

12. A non-transitory computer-readable storage medium containing program instructions for using defined computing entities, wherein execution of the program instructions by one or more processors causes the one or more processors to perform steps comprising:
    based on user input information, creating a new defined entity type that describes a data structure of a defined computing entity and at least one behavior of the defined computing entity;
    automatically creating a set of rights for accessing the new defined entity type when the new defined entity type is created based on the user input information;
    defining the at least one behavior of the defined computing entity by associating at least one interface with the new defined entity type, wherein the at least one interface represents a reference entity type with a collection of behavior information; and
    executing an operation on the defined computing entity according to the at least one behavior of the defined computing entity.

13. The non-transitory computer-readable storage medium of claim 12, wherein the set of rights for accessing the new defined entity type defines a plurality of levels of access control of the new defined entity type by a user or an administrator.

14. The non-transitory computer-readable storage medium of claim 12, wherein the steps further comprise instantiating the defined computing entity as an instance of the new defined entity type, wherein the defined computing entity has the data structure and exhibits the at least one behavior.

15. The non-transitory computer-readable storage medium of claim 12, wherein executing the operation on the defined computing entity according to the at least one behavior of the defined computing entity comprises executing the operation on the defined computing entity in a hybrid cloud system according to the at least one behavior of the defined computing entity.

16. The non-transitory computer-readable storage medium of claim 12, wherein the at least one behavior of the defined computing entity represents an executable operation having an operation definition and an operation binding, and wherein the operation definition comprises a name of the executable operation, input information of the executable operation, and output information of the executable operation, and wherein the operation binding comprises a type of execution of the executable operation and a logic to be executed for the executable operation.

17. The non-transitory computer-readable storage medium of claim 12, wherein the data structure of the defined computing entity is defined as a data schema that the defined computing entity adheres to, and wherein the data schema represents at least one data field to be presented in the defined computing entity and data type information, cardinality information, and optionality information of the at least one data field.

18. The non-transitory computer-readable storage medium of claim 12, wherein the defined computing entity comprises a run-time entity.

19. A system, the system comprising:
memory; and
one or more processors configured to:
  based on user input information, create a new defined entity type that describes a data structure of a defined computing entity and at least one behavior of the defined computing entity;
  automatically create a set of rights for accessing the new defined entity type when the new defined entity type is created based on the user input information;
  define the at least one behavior of the defined computing entity by associating at least one interface with the new defined entity type, wherein the at least one interface represents a reference entity type with a collection of behavior information; and
  execute an operation on the defined computing entity according to the at least one behavior of the defined computing entity.

20. The system of claim 19, wherein the set of rights for accessing the new defined entity type defines a plurality of levels of access control of the new defined entity type by a user or an administrator.

* * * * *